United States Patent
Petroski et al.

(10) Patent No.: US 6,919,406 B2
(45) Date of Patent: Jul. 19, 2005

(54) MODIFIED POLYOLEFIN FILMS

(75) Inventors: John A. Petroski, Ravenna, OH (US); Rachna Mohan, Solon, OH (US)

(73) Assignee: The XLO Group of Companies, Inc., Cleveland, OH (US)

( * ) Notice: Subject to any disclaimer, the term of this patent is extended or adjusted under 35 U.S.C. 154(b) by 48 days.

(21) Appl. No.: 10/435,972

(22) Filed: May 12, 2003

(65) Prior Publication Data

US 2003/0225218 A1 Dec. 4, 2003

Related U.S. Application Data

(60) Provisional application No. 60/384,331, filed on May 30, 2002.

(51) Int. Cl.[7] .............................. C08F 8/00; C08L 23/00; C08L 33/00; C08L 33/04; C08L 35/00
(52) U.S. Cl. ........................ 525/191; 525/217; 525/222; 525/238; 525/239; 525/240; 525/241
(58) Field of Search ................................ 525/191, 217, 525/222, 238, 239, 240, 241

(56) References Cited

U.S. PATENT DOCUMENTS

| | | | |
|---|---|---|---|
| 3,987,122 A | 10/1976 | Bartz et al. | |
| 4,299,930 A | 11/1981 | Boggs | |
| 4,551,380 A | * 11/1985 | Schoenberg | ................ 428/218 |
| 4,981,231 A | 1/1991 | Knight | |
| 6,380,296 B1 | * 4/2002 | Inada | ........................ 524/445 |

* cited by examiner

*Primary Examiner*—Nathan M. Nutter
(74) *Attorney, Agent, or Firm*—Fay, Sharpe, Fagan, Minnich & McKee, LLP

(57) ABSTRACT

Disclosed are techniques and related material blends for improving adhesion between a polyolefin film and a pressure sensitive adhesive, and also significantly decreasing the coefficient of thermal expansion of a polyolefin film by modifying the chemical properties of the film. Specifically, particular amounts of a modifying polymer and/or copolymer such as ethylene vinyl acetate are incorporated into the polyolefin film. The polyolefin film may for instance be either a polyethylene or polypropylene film.

18 Claims, No Drawings

MODIFIED POLYOLEFIN FILMS

CROSS REFERENCE TO RELATED APPLICATIONS

The present invention claims priority from U.S. provisional application Ser. No. 60/384,331 filed May 30, 2002.

FIELD OF THE INVENTION

The present invention relates to modified polyolefin films having particular characteristics and methods relating to the use of those modified polyolefin films.

BACKGROUND OF THE INVENTION

Historically, modification of adhesive properties has been accomplished by altering adhesive parameters such as the type of formula components, ratios of components, coating thicknesses, cure schedules, internal reinforcements, etc. Although satisfactory in many respects, it is not always feasible to modify the adhesive or application of the adhesive. Accordingly, it would be desirable to provide a method of improving adhesive performance without modifying the adhesive formulation or parameters directly associated with the adhesive itself or its application.

Properties of particular importance concerning adhesives and their application are peel strength and shear performance. Generally, these properties can be modified to a certain extent. However, modification of these properties beyond a certain point adversely affects other properties of an adhesive. Specifically, it is often desirable to improve peel and shear strength at elevated temperatures. Although techniques for improving these characteristics are known, these techniques generally require the use of reinforcing resins or achieving particular degrees of crosslinking, one or both of which can detract from tack and general adhesion of the resulting adhesive. Accordingly, it would be beneficial to provide methods for improving peel strength and/or shear performance without significantly detracting from other properties of the adhesive.

Low density polyethylene (LDPE) film is particularly suited for use as a water shield or water deflector such as in automotive door assemblies due to the material's toughness, water resistance, and favorable strength and flexibility properties at both low and high temperatures. LDPE films have been used with pressure sensitive adhesives and have provided a cost effective solution to water intrusion for many vehicle component parts. Such films are often adhesively bonded to an underlying substrate. A significant problem related to the use of LDPE with certain pressure sensitive adhesives however, relates to heat characteristics. When the coefficient of thermal expansion of polyethylene does not match that of the substrate to which it is attached, such as many metals, the greater expansion upon heating of polyethylene can result in film buckling and debonding of the adhesive. For example, upon heating, a metal automotive door expands significantly less than polyethylene. A polyethylene part adhered to the door which may be 30 inches long at room temperature can expand to 31 inches long at 160° F. The excess expansion of the polyethylene imparts significant strain on the adhesive's ability to maintain adequate bond strength. Failure of the adhesive bond can result in the intrusion of water, dust and noise through the automotive component or door. Accordingly, it would be desirable to provide a technique for reducing the coefficient of thermal expansion of polyethylene so that polyethylene films could be used in conjunction with metal automotive components and conventional adhesives could maintain a bond between those materials.

SUMMARY OF THE INVENTION

The present invention achieves the noted objectives and provides, in a first aspect, a technique and related blend for improving bond strength between a polyolefin film such as polyethylene or polypropylene, and an adhesive. The present invention also provides, in another aspect, a technique and related blend for decreasing the thermal expansion of a polyolefin material. The techniques and blends are based upon the incorporation of one or more modifying polymers such as ethylene vinyl acetate in the polyolefin.

Specifically, in a first aspect, the present invention provides a method for improving bond strength between a polyolefin film and an adhesive. The method comprises a step of providing a polyolefin for subsequent use in forming a film. The method includes a step of providing an effective amount of ethylene vinyl acetate. The method further comprises a step of incorporating the ethylene vinyl acetate in the polyolefin to form a modified blend. The method additionally includes a step of forming a film from the modified blend in which the film exhibits improved bonding characteristics with adhesives that are subsequently applied to the film.

In yet another aspect, the present invention provides a method for decreasing the thermal expansion characteristics of a polyolefin material. The method comprises a step of providing a polyolefin material. The method also comprises a step of incorporating from about 1% to about 50% of ethylene vinyl acetate in the polyolefin material to thereby decrease the thermal expansion characteristics of the polyolefin material.

In yet another aspect, the present invention provides a polyolefin blend consisting essentially of a polyolefin selected from the group consisting of polyethylene, polypropylene, vinylidene chloride, vinyl chloride, polyethylene terephthalate, polystyrene acrylonitrile, polyamides, and copolymers thereof. The blend also consists essentially of from about 1% to about 50% based on the weight of the polyolefin, of ethylene vinyl acetate. The resulting polyolefin blend exhibits improved bonding characteristics with reduced thermal expansion characteristics.

DETAILED DESCRIPTION OF THE PREFERRED EMBODIMENTS

The present invention relates to the modification of certain polyolefin films to impart particular desirable properties such as promoting adhesion with certain adhesives, and reducing the coefficient of thermal expansion of the modified polyolefin film. In a first aspect, the present invention includes modification of a polyolefin film, such as polyethylene or polypropylene, with other polymers or copolymers such as ethylene vinyl acetate (EVA). The modifying polymers or copolymers may constitute from about 1% to about 50% by weight of the final polyolefin film. All percentages expressed herein are percentages by weight unless noted otherwise. Incorporation of such modifying polymers and/or copolymers, such as EVA, in a polyolefin material forming a thin film has been found to significantly increase the heat stability or rather decrease the coefficient of thermal expansion of the resulting modified polyolefin film. Furthermore, incorporation of such polymers and/or copolymers such as EVA into a polyolefin film has been found to lead to significantly improve adhesive bond with most pressure sensitive adhesives.

Specifically, it has been discovered that incorporation of a polymer or copolymer such as EVA in an amount of 1% to about 50% in a polyolefin has been found to significantly decrease the coefficient of thermal expansion of the modified polyolefin. This property has been exhibited by modified polyolefin films at temperatures as high as 176° F. Specifically, for EVA, the preferred amount is from about 7.5% to about 30%. The most preferred is about 30%. An example of a modified polyolefin as described herein is a polyethylene resin modified with 40% of an EVA copolymer, which contains 30% VA. This would result in a polyolefin material or blend as described herein having an effective amount of VA of about 12%.

A wide array of polyolefins may be modified according to the present invention. Examples of such polyolefins include, but are not limited to, polyethylene, polypropylene, vinylidene chloride, vinyl chloride, polyethylene terephthalate, polystyrene acrylonitrile, polyamides, and related copolymers of any of these. Specifically, the following types of polyolefins can be modified as described herein. Particular and preferred examples of such polyolefins include, but are not limited to, low density polyethylene (LDPE), linear low density polyethylene (LLDPE), high density polyethylene (HDPE), ultra-low density polyethylene (ULDPE), ethylene plastomers, ultra-high molecular weight polyethylene (UHMWPE), and polypropylene (PP). Additionally, grafted polyolefins such as polyethylene with silicone, or ethylene copolymers such as ethylene n-butyl acrylate or ethylene methyl acrylate may also be utilized. The preferred polyolefins for use with the present invention are LDPE and LLDPE. The most preferred is LLDPE.

With respect to improving the adhesive bond between a polyolefin film and an adhesive, it is been discovered that a modifying polymer or copolymer such as EVA may be incorporated in a polyolefin film in the range of from about 1% to about 50% by weight. Without being limited to any particular theory, it is believed that increase peel and shear strength is due to the increased ability to transfer energy into the main body of the film as opposed to concentrating the transferred energy at a single point of adhesive to substrate contact. For example, if an adhesively bonded layer is peeled upwards at a 90° angle from its underlying substrate, most of the force is concentrated at the point of peel. With the modified films as described herein, it is believed that the force is transferred into the film and remainder of the adhesive body to better dissipate and transfer energy.

With respect to achieving a decrease in thermal expansion of a polyolefin, there are two theories upon which the present invention is based. Again, it will be appreciated that the present invention is not limited to either or both of these theories, they are merely presented for purposes of explaining and better understanding the present invention. A first theory is based upon a phenomena that the modifying polymer or copolymer may not be 100% compatible with the polyolefin resin within which it is mixed. This could cause discrete domains of polyolefin and copolymer rather than a homogenous blend. The domains may act as firewalls or breaks which interrupt the force of expansion upon heating. It has been demonstrated, for example, that adding an inorganic filler such as calcium carbonate or flame-retardants can also reduce thermal expansion. Such materials may also be added to the polymer matrix.

Another theory involving the present invention, is that by introducing a modifying polymer or copolymer with a significantly lower softening point or melting point, it is possible to cause relaxation of tensional stress caused by manufacturing of the film. Molten film is stretched during processing or formation. As the film cools while still under tension, the tensional force may be locked in. By introducing a modifying polymer or copolymer with a significantly lower softening point than polyethylene, for instance of at least about 40° C., a portion of the built in tensional force may be allowed to relieve itself, before the polyethylene expands.

With regard to improving adhesive bond between a polyolefin film and an adhesive, data collected by the present inventors indicates that peel and shear strength increase with increasing amounts of copolymer. Concerning temperature characteristics of polyolefins, additional testing conducted with regard to the present invention reveals that conventional non-modified polyolefin film exhibited dimensional growth with increasing temperature. This is known. The EVA copolymer modified films in accordance with the present invention, exhibited a decrease.

The present invention encompasses the modification of polyolefin film such as polyethylene and polypropylene with nearly any polymer and/or copolymer such as ethylene vinyl acetate. Preferably, the modifying polymer that is added to the polyolefin has a softening point less than that of the polyolefin. The present invention may be applied to nearly any type of plastic film or applications involving those films, especially where used in conjunction with an adhesive.

The present invention may be utilized in conjunction with numerous types of adhesives. Preferably, the adhesive is a pressure sensitive adhesive. Generally, pressure sensitive adhesives include an elastomeric polymer, a tackifying resin, one or more fillers, various antioxidants and stabilizers, and if needed, crosslinking agents.

TESTING

A series of trials were conducted in which the same adhesive formula was coated onto four test films: (a) a conventional LDPE film representing the control sample and designated as Sample A, (b) a film containing approximately 30% of an EVA copolymer and designated as Sample B, (c) a film containing approximately 40% of an EVA copolymer and designated as Sample C, and (d) a film containing approximately 50% of an EVA copolymer and designated as Sample D.

Adhesive performance was measured by comparing a 90° shear resistance force at 80° C. Elevated temperature was utilized to accelerate sample movement. The present test utilized one-inch wide specimens bonded for three linear inches on a metal test panel. The panels were suspended so that the adhesive sample was on the underside of the panel and in a horizontal position in a heated chamber at 80° C. A 15 gram weight was attached to each specimen, and the time needed to pull the sample away from the panel at a 90° separation angle was recorded.

Set forth below are the times to failure (in minutes) for each of the noted samples.

|  | Sample A | Sample B | Sample C | Sample D |
| --- | --- | --- | --- | --- |
| Time to failure (Minutes) | 10.9 | 19.7 | 398 | 762 |

This clearly demonstrates that modified polyolefin films exhibit significantly improved adhesive peel and shear strength characteristics without directly changing the chemical nature of the adhesives.

The foregoing description is, at present, considered to be the preferred embodiments of the present invention. However, it is contemplated that various changes and modifications apparent to those skilled in the art, may be made without departing from the present invention. Therefore, the foregoing description is intended to cover all such changes and modifications encompassed within the spirit and scope of the present invention, including all equivalent aspects.

We claim:

1. A method for improving adhesive strength of a polyolefin film and a pressure sensitive adhesive, said method comprising:
   providing a polyolefin for subsequent use in forming a film, said polyolefin being selected from the group consisting of polyethylene, polypropylene, and copolymers thereof;
   providing an effective amount of ethylene vinyl acetate;
   blending said ethylene vinyl acetate and said polyolefin to form a modified blend;
   forming a film from said modified blend, wherein said film exhibits improved bonding characteristics with adhesives applied to said film.

2. The method of claim 1 wherein said effective amount of said ethylene vinyl acetate in said polyolefin is from about 1% to about 50%.

3. The method of claim 2 wherein said effective amount is from about 7.5% to about 30%.

4. The method of claim 3 wherein said effective amount is about 30%.

5. The method of claim 1 wherein said polyolefin is polyethylene and said polyethylene is selected from the group consisting of low density polyethylene, linear low density polyethylene, high density polyethylene, ultra-low density polyethylene, ethylene plastomers, ultra-high molecular weight polyethylene, and combinations thereof.

6. The method of claim 1 further comprising:
   providing a grafted polyolefin selected from the group consisting of (i) polyethylene with silicone, (ii) ethylene n-butyl acrylate, (iii) ethylene methyl acrylate, and combinations thereof; and
   incorporating said grafted polyolefin with said modified blend.

7. A method for decreasing the thermal expansion characteristics of a polyolefin material, said method comprising:
   providing a polyolefin material, wherein said polyolefin is selected from the group consisting of polyethylene, polypropylene, and copolymers thereof;
   blending from about 1% to about 50% of ethylene vinyl acetate in said polyolefin material to thereby decrease the thermal expansion characteristics of said polyolefin material.

8. The method of claim 7 wherein said effective amount is from about 7.5% to about 30% of said ethylene vinyl acetate is incorporated in said polyolefin material.

9. The method of claim 7 wherein about 30% of said ethylene vinyl acetate is incorporated in said polyolefin material.

10. The method of claim 7 wherein said polyolefin is polyethylene and said polyethylene is selected from the group consisting of low density polyethylene, linear low density polyethylene, high density polyethylene, ultra-low density polyethylene, ethylene plastomers, ultra-high molecular weight polyethylene and combinations thereof.

11. The method of claim 7 further comprising:
   providing a grafted polyolefin selected from the group consisting of (i) polyethylene with silicone, (ii) ethylene n-butyl acrylate, (iii) ethylene methyl acrylate, and combinations thereof; and
   incorporating said grafted polyolefin with said modified blend.

12. A polyolefin blend consisting essentially of (i) a polyolefin selected from the group consisting of polyethylene, polypropylene, and copolymers thereof, and (ii) from about 1% to about 50% based on the weight of said polyolefin of ethylene vinyl acetate, wherein said resulting polyolefin blend exhibits improved bonding characteristics and reduced thermal expansion characteristics.

13. The blend of claim 12 wherein the amount of ethylene vinyl acetate is from about 7.5% to about 30%.

14. The blend of claim 12 wherein the amount of ethylene vinyl acetate is about 30%.

15. The blend of claim 12 wherein the polyolefin is polyethylene.

16. The blend of claim 15 wherein the polyethylene is selected from the group consisting of low density polyethylene, linear low density polyethylene, high density polyethylene, ultra-low density polyethylene, ethylene plastomers, ultra-high molecular weight polyethylene and combinations thereof.

17. The blend of claim 12 wherein said polyolefin is linear low density polyethylene and the amount of said ethylene vinyl acetate is 30%.

18. The blend of claim 12 wherein said polyolefin is polyethylene and the softening point of said polyethylene is more than 40° C. higher than the softening point of said ethylene vinyl acetate.

* * * * *